Patented July 4, 1939

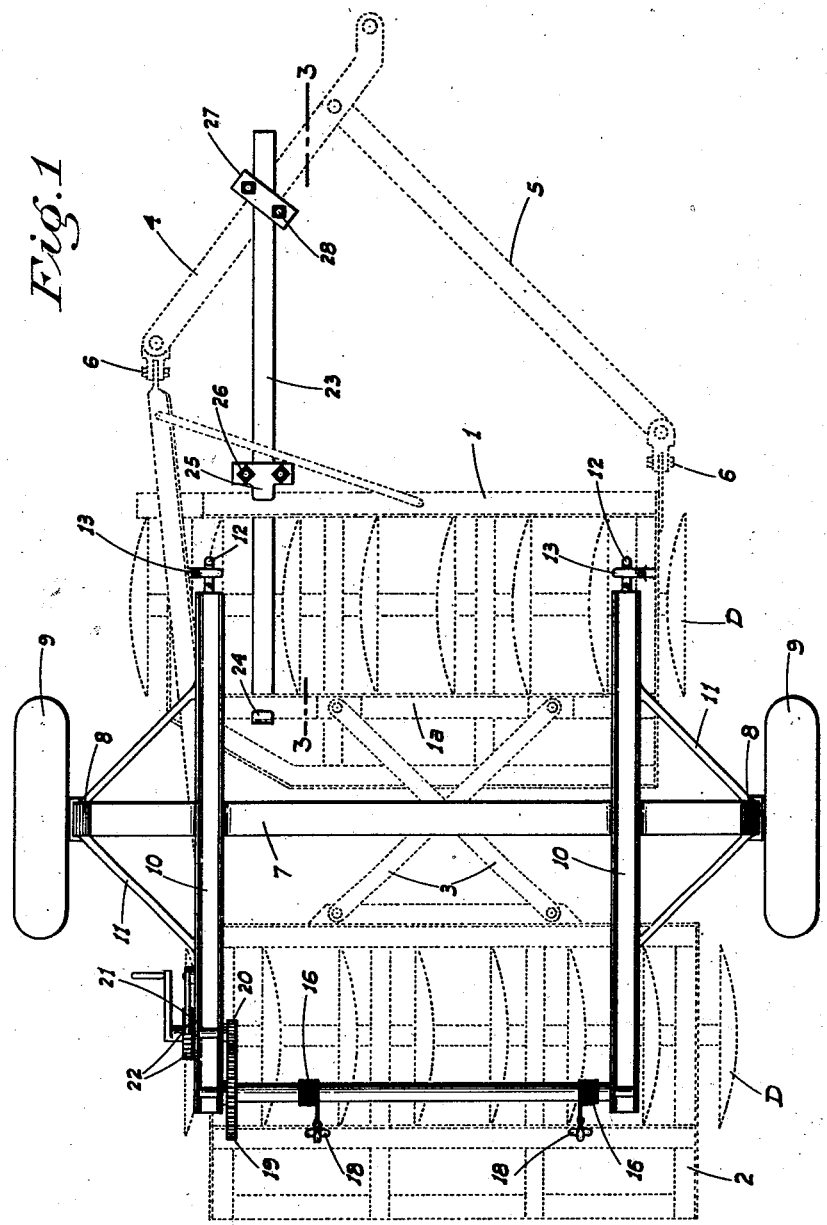

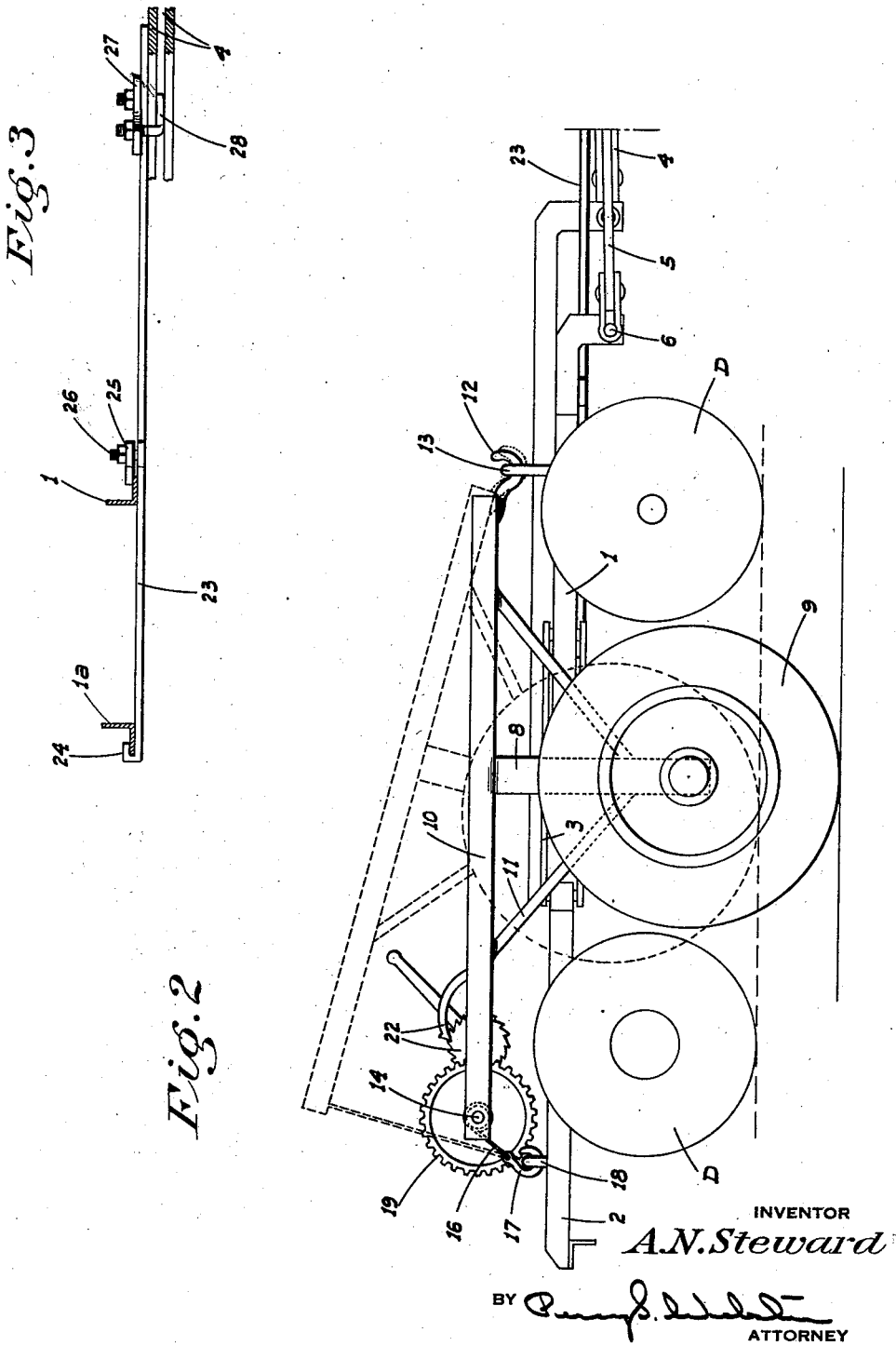

2,164,550

UNITED STATES PATENT OFFICE 2,164,550

TRANSPORT CRADLE FOR DISK HARROWS

Arthur N. Steward, Anderson, Calif.

Application August 17, 1937, Serial No. 159,510

3 Claims. (Cl. 55—73)

This invention relates to agricultural implements and particularly to disk harrows. Such implements have no wheels and if it is desired to transport the same along the highway they must now be placed on the bed of a truck or wagon. This is an inconvenient and time consuming operation.

The principal object of my invention is to facilitate harrow transportation by providing a wheeled cradle or cart, adapted to be quickly and easily moved into a supporting position relative to the harrow, and arranged so that the harrow may be easily lifted clear of the ground and held suspended from the cart. This may be done without uncoupling the harrow from the tractor if desired and the latter may be used as a means for hauling the harrow along the road.

A further object is to construct a cart so that when the harrow is suspended therefrom, a self-steering structure is provided which will properly follow the turning of the tractor in one direction or the other without any attention from the tractor operator.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a top plan view of my transporting cart as applied to a conventional tandem disk harrow.

Figure 2 is a side elevation of the cart shown as supporting a harrow.

Figure 3 is a fragmentary longitudinal section on the line 3—3 of Figure 1 showing the tongue unit.

Referring now more particularly to the characters of reference on the drawings, the harrow of the conventional type shown comprises front and rear gang frames 1 and 2 respectively in which the disks D are mounted. The frames are connected by links 3 arranged so that the frames may be angled in a horizontal plane relative to each other but are maintained as usual against relative deflection in a vertical plane. Forwardly converging bars 4 and 5 form a draft unit pivoted on the front gang frame 1 as shown at 6 for swivel movement in a vertical plane as usual, the unit being adapted at its forward end for connection with a tractor or similar vehicle.

My transport cart for use in connection with a harrow of the above general type comprises a transverse frame beam 7 having depending extensions 8 at its ends on the lower ends of which a pair of outwardly disposed wheels 9 are turnably mounted. The length of the beam is wider than the over all width of the harrow and the diameter of the wheels is such that said beam is on a level well above the harrow frame when the harrow disks D are resting on the ground.

Longitudinal beams 10 are supported on and are rigid with the beam 7 and extend both to the front and rear of the same. These beams are spaced apart a distance slightly less than the width of the harrow frames and are braced from the extensions 8 by diagonal members 11.

At their forward ends the beams 10 carry forwardly projecting upwardly opening rigid hooks 12 which are adapted to engage downwardly opening hooks 13 upstanding from and rigid with the side of the frame 1 toward the front end thereof. At their rear ends the beams 10 are connected by a shaft 14 on which, between the beams, a turnable sleeve 15 is mounted. This sleeve forms drums for a pair of cables 16 which are disposed on said sleeve near the beams. Hooks 17 on the cables are adapted to engage eyes 18 secured on and upstanding from the rear harrow frame 2 toward its rear end. At one end the sleeve carries a gear 19 meshing with a pinion 20 secured on a hand turned crank shaft 21, a releasable pawl and ratchet unit 22 being associated with the shaft 21 to prevent rotation of the same in a direction which would allow the cables to unwind from their drums.

In operation when it is desired to lift the transporting harrow, the frames of the latter are first restored if necessary from an angled position to a parallel one as shown in Figure 1. The cart is then run into position over the harrow and the beams 10 are tilted down at their forward end (the cart of course readily turning about the wheels 9 as an axis) until the hooks 12 engage with the hooks 13 as indicated in dotted lines in Figure 2. The pawl and ratchet unit 22 is released to allow the cables 16 to be run off the drums so that the hooks 17 may be engaged with the eyes 18. The crank shaft 21 is then rotated to wind the cables onto the drums, causing the beams 10 to be both restored to a horizontal position and the harrow frames to be raised clear of the ground to the position shown in Figure 2. The location of the hooks on the harrow frames is such relative to the position of the wheels 9 that the weight of the harrow is substantially balanced from the cart.

With the swivel draft bar unit of the harrow connected to the hauling vehicle however, and with only a two-wheel cart (the purpose of which is to facilitate steering) the harrow and cart as a unit would tend to tilt back and forth with every uneven movement of the tractor or irregularity in the road surface. I therefore provide means to maintain this draft unit against swivel movement while the harrow is being transported.

This means comprises a rigid tongue 23 adapted to extend under the frame 1 and over the bar 4. At its rear end the tongue is bent upwardly to form a forwardly facing hook 24 adapted to engage over one of the transverse members 1a of the frame 1. The tongue is releasably clamped against the front member of the frame 1 by a plate 25 overhanging said member and removably secured on the tongue by bolts 26. Where the tongue crosses the diagonally extended bar 4, a clamp plate 27 bears on the tongue. This plate is engaged by a clamping U-bolt 28 which projects through the plate to the sides of the tongue and bar and under the latter (or between the spaced elements of the same if the bar is of double construction as indicated in Figure 3). In this manner the harrow frame and draft unit form a rigid structure, supported at the front end by the tractor and toward the rear end by the cart. Since the cart as stated is of the two-wheel type, not only is it of very simple and cheap construction but it is obviously self-steering.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A transporting cart for an implement, said implement including a frame, and a draft bar unit for connection to a hauling vehicle connected to the frame for swivel movement in a vertical plane; said cart comprising a frame adapted to overhang the implement frame, a pair of wheels supporting said cart and means between the cart and implement frames to support the implement in substantially balanced and suspended relation to the cart, and detachable means applied between the implement frame and draft unit to hold the latter against swivel movement.

2. A structure as in claim 1, in which said last named means comprises a rigid tongue adapted to extend lengthwise of the implement and to engage the draft bar and a portion of the implement frame, and means to releasably clamp the tongue against said bar and frame portion.

3. A transporting structure for an implement, said implement including a frame and a draft unit adapted for attachment to a draft device connected to the frame for swivel movement in a vertical plane; said structure comprising a wheel mounted cart adapted to overhang the implement frame, detachable connection means between the cart and implement frame to maintain the implement suspended from the cart and means applied to the draft unit to hold the same against swivel movement.

ARTHUR N. STEWARD.